S. P. HAY.
MILK CONDENSER.
APPLICATION FILED FEB. 1, 1912.

1,042,912.

Patented Oct. 29, 1912.

Witnesses

Soren P. Hay,
Inventor by C. A. Snow & Co.
Attorneys

UNITED STATES PATENT OFFICE.

SOREN P. HAY, OF SPOKANE, WASHINGTON.

MILK-CONDENSER.

1,042,912.  Specification of Letters Patent.  Patented Oct. 29, 1912.

Application filed February 1, 1912. Serial No. 674,635.

*To all whom it may concern:*

Be it known that I, SOREN P. HAY, a citizen of the United States, residing at Spokane, in the county of Spokane and State of Washington, have invented a new and useful Milk-Condenser, of which the following is a specification.

This invention relates to milk condensers.

The object of the invention is to provide an apparatus of this character in which a constant circulation is maintained and in which a complete condensation or evaporation of the milk is secured without the use of a vacuum.

Figure 1:
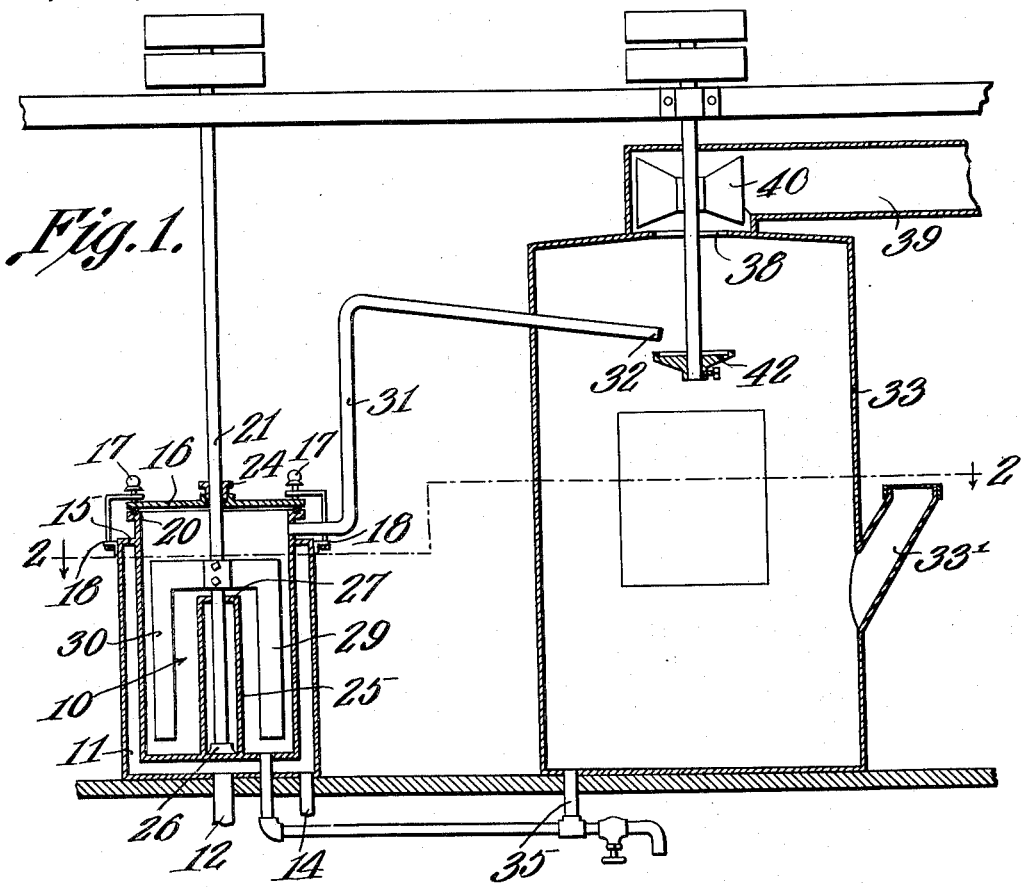
Figure 2:
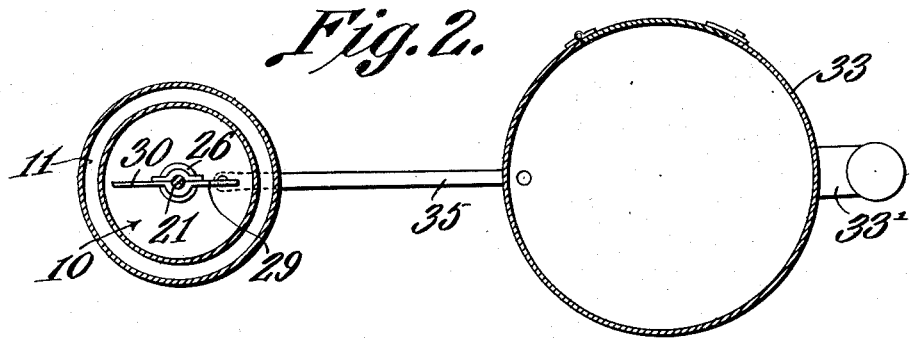

In the drawings,—Figure 1 is an elevation partly in section of the complete apparatus. Fig. 2 is a section on the line 2—2 of Fig. 1.

In the drawings, 10 designates the milk heater which is surrounded by the casing or steam jacket 11 formed with the steam inlet 12 and the steam outlet 14. The milk receptacle 10 extends beyond the casing 11 and is held in a suspended position by the flanges 15 which engage the edges of the casing 11. The cover 16 of the receptacle is clamped on by set-screws 17 which pass through the brackets 18 secured to the casing 11. This provides an air-tight closure for the receptacle, the lid being provided with an annular flange 20 which extends within the receptacle 10. The shaft 21 extends centrally within the milk receptacle 10, passing through the gland 24 in the lid. This shaft extends within the tube 25 which is secured to the base of the receptacle and its end portion rests in the bearing 26, the tube 25 being formed with the flange 27 which embraces the shaft.

The agitator 29 is mounted upon the shaft 21 said agitator consisting of the blades 30. The shaft 21 is driven by any suitable motor and the milk which is heated in the receptacle 10 is raised through the pipe 31 which is provided with a nozzle 32 which extends within the tank 33, it being noted that the milk will be raised by centrifugal force, as the agitator is rotated. The tank or vat 33 is provided with a spout 33' through which the milk is poured, the same passing through the connection 35 to the heater 10. The tank 33 is provided with an opening 38 which communicates with the pipe 39, a fan 40 being positioned on the shaft 36 which extends within the tank at the entrance to the pipe 39. The cup 42 is positioned on said shaft immediately below said pipe, the nozzle 32 discharging the milk upon this revolving cup which distributes the same in a foggy condition against the walls of the tank 33.

The milk is elevated in a heated condition by the agitator 29 and is sprayed upon the cup 42 while at a high temperature, the cup 42 throwing the milk in a foggy condition against the walls of the receptacle 33. The milk then drips down the walls of the tank settling in said tank, a portion of the same then passing through the return pipe 35 to the milk receptacle where it is reheated and again conveyed in the manner above described to the receptacle 33. This circulation is maintained until the proper condensation is secured, the condensed or evaporated milk being deposited in the receptacle 33. As the milk passes to the rotary cup which distributes the same against the walls of the receptacle, the fan positioned within the pipe 39 draws the vapor and moisture from the same, forcing said vapor and moisture through the pipe 39, thus drying out the heated milk and assisting in the condensation.

What is claimed is:—

1. A milk condenser comprising a receiving tank, a milk receptacle, means for heating the milk in said receptacle, a connection between said tank and said receptacle, means for spraying the milk in a heated state within said tank, and means for returning the milk to said milk receptacle.

2. A milk condenser comprising a milk receptacle, an agitator arranged in said receptacle, a tank, a connection between the upper portion of said milk receptacle and said tank, said agitator raising the milk arranged within said receptacle through said connection, a shaft disposed vertically within said tank, a receptacle mounted on said shaft, and receiving the milk supplied to said tank, said tank being formed with an opening through which said shaft projects, a pipe registering with said opening and a fan mounted on said shaft, said fan causing the moisture from the milk supplied to said tank, to pass through said pipe.

In testimony that I claim the foregoing as my own, I have hereto affixed my signature in the presence of two witnesses.

SOREN P. HAY.

Witnesses:
IRVING R. DAVIS,
JOHN E. ORR.